Jan. 17, 1956 N. E. HART 2,731,309
BEARING THRUST ADJUSTMENT
Filed May 12, 1953 2 Sheets-Sheet 1
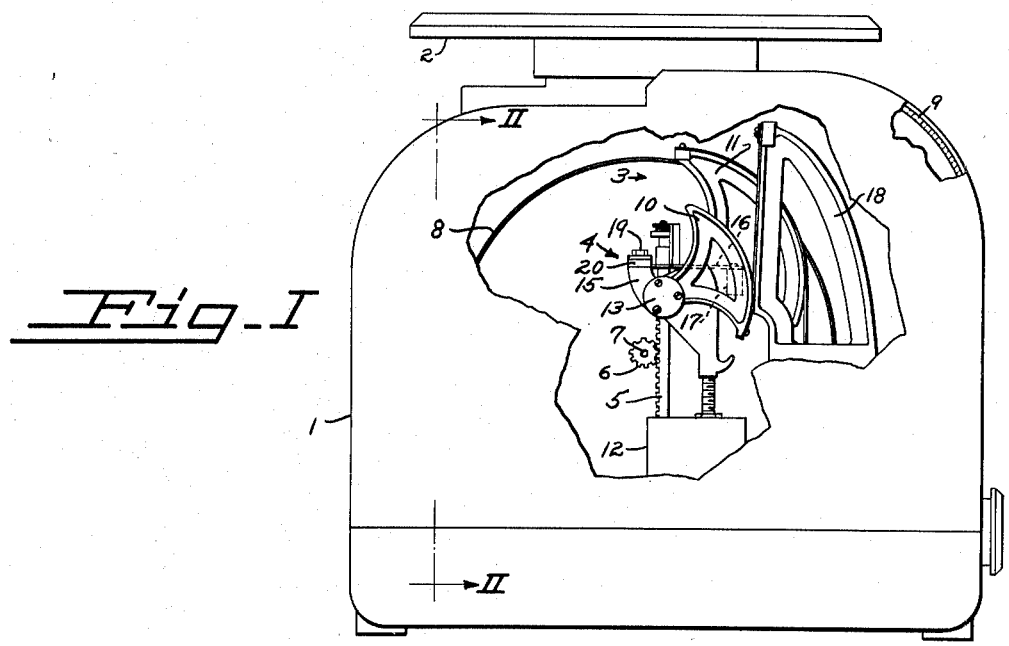
Fig. I
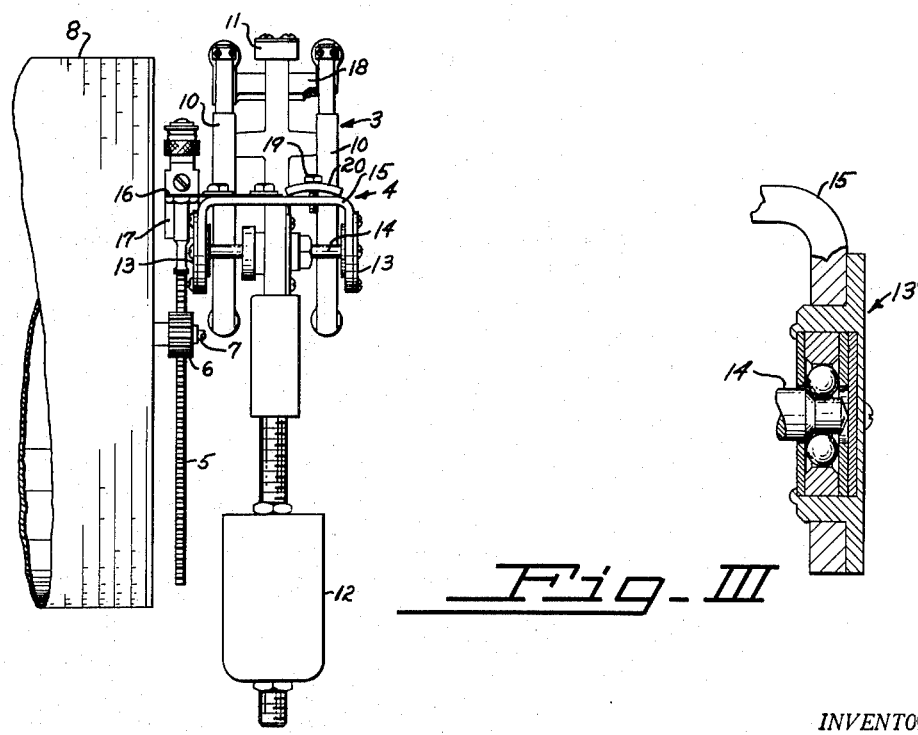
Fig. II
Fig. III
INVENTOR.
NORMAN E. HART
BY
Marshall, Marshall & Hasting
ATTORNEYS

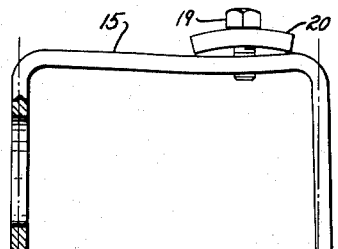
Fig. IV
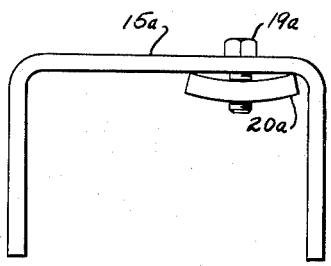
Fig. VII
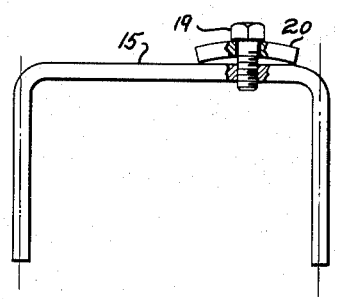
Fig. V
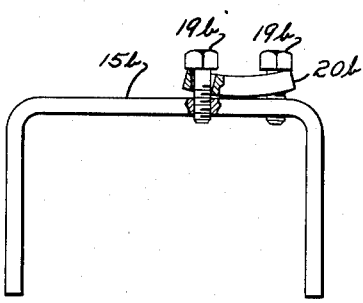
Fig. VIII
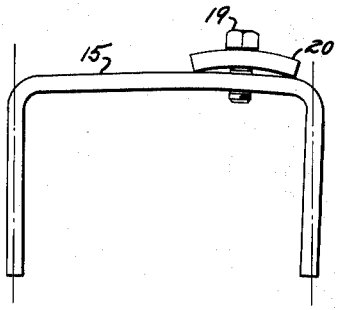
Fig. VI
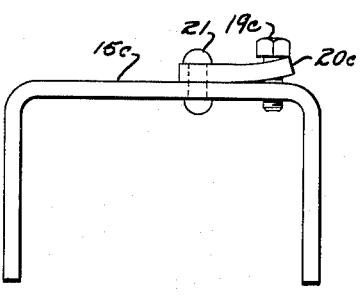
Fig. IX
INVENTOR.
NORMAN E. HART
BY
Marshall, Marshall & Yeasting
ATTORNEYS

United States Patent Office 2,731,309
Patented Jan. 17, 1956

2,731,309

BEARING THRUST ADJUSTMENT

Norman E. Hart, Toledo, Ohio, assignor to Toledo Scale Company, Toledo, Ohio, a corporation of New Jersey Application May 12, 1953, Serial No. 354,577

15 Claims. (Cl. 308—178)

This invention relates to means for adjusting the distance between a pair of bearings journaling a rotatable shaft of a weighing scale.

In a precision device such as a weighing scale, friction between moving parts must necessarily be held to a minimum if accurate weighing is to be achieved. This is especially true where a portion of the moving mechanism comprises a shaft rotatably journaled in bearings. Rotatable indicators and rotatable charts are common examples of members which are attached to such shafts and are rotatable therewith. Whenever one of the above members is employed in a weighing scale and the member is mounted on a rotatable shaft, it is necessary that there be very little, if any, friction between the bearings and the shaft. In addition, the amount of end play of the shaft should be as little as is possible without creating any friction between the shaft and bearing. It follows then that provision should be made for adjusting the end play of the shaft. Generally speaking, one or both of the bearings are moved axially in a stationary member in which they are carried to effect such an adjustment. There are instances, however, in which it is not only difficult but also impractical to so adjust the bearings with respect to the member in which they are mounted.

The principal object of this invention is to provide improved means for adjusting the amount of end play of a shaft rotatably journaled in a pair of bearings.

Another object of the invention is to provide means for effecting an adjustment of the distance between the arms of a U-shaped elastically deformable member.

More specifically, the object of the invention is to provide means for adjusting the amount of end play of a shaft rotatably carried in bearings mounted in the arms of an elastically deformable U-shaped member by varying the distance between the arms.

Other objects and advantages will be apparent from the following description in which reference is had to the accompanying drawings.

According to the invention a U-shaped sector yoke has arms carrying bearings in which is journaled a rotatable shaft. To effect an adjustment of the amount of end play of the shaft in the bearings, the base of the U is deformed by urging a portion of the base spanned by an arched rigid member into partial conformity with the rigid member.

In the drawings:

Figure I is an end elevational view, with parts being broken away, of a weighing scale embodying the invention.

Figure II is an enlarged fragmentary elevational view taken substantially along lines II—II of Figure I.

Figure III is an enlarged view of a bearing assembly of the type employed in the invention.

Figures IV, V and VI illustrate the range of adjustment of the preferred form of the invention. Figures IV and VI are slightly exaggerated.

Figures VII, VIII and IX illustrate modifications of the invention.

These specific figures and the accompanying description are intended merely to illustrate the invention but not to limit its scope.

Referring to Figure I, a weighing scale embodying the invention comprises a housing 1 overlying which is a load receiving platter 2. Automatic load counterbalancing mechanism 3 operatively connected to the platter 2 carries a rack drive assembly 4, a rack 5 of which engages with a pinion 6 fixed to a chart shaft 7 to rotate a chart 8 in response to loads placed on the platter 2. Indications of the weight of a load on the platter 2 may be viewed on the surface of the chart 8 through a window 9 and a lens system (not shown).

The automatic load counterbalancing mechanism 3 is of the floating pendulum type and comprises a pair of fulcrum sectors 10, a load sector 11 and a pendulum weight 12. Since the construction and operation of the load counterbalancing mechanism is well known in the art, the description thereof will be limited to that necessary for a proper understanding of the instant invention.

Pivotally supported by anti-friction bearings 13 on a shaft 14 the axis of which lies at the center of curvature of the fulcrum sectors 10 is a U-shaped sector yoke 15 upon which is fixed a horizontally extending resilient leaf 16. The rack 5 is mounted for vertical adjustment on the leaf. A counterweight 17 is fixed to the extended end of the leaf 16 and acts to keep the rack 5 meshed with the pinion 6 mounted on the chart shaft 7. The ends of the chart shaft 7 are rotatably journaled by anti-friction bearings (not shown) mounted from portions of the framework of the scale.

It is to be understood that when a load is applied to the platter 2, the force of gravity acting upon the load is transmitted to the load sector 11 in the usual manner, thus causing the pendulum weight 12 to swing outwardly and upwardly and the fulcrum sectors 10 to roll upwardly along the nearly vertical faces of a bracket 18 until a position is reached at which the load on the platter 2 is counterbalanced. As the fulcrum sectors 10 roll upwardly, the rack moves upwardly in a direction parallel to the nearly vertical faces of the bracket 18. It follows that friction between the bearings 13 and the shaft 14 must be held to a minimum so that the yoke 15 carrying the rack 5 may rotate freely to prevent inaccuracies in weighing.

Adjustment of the bearings 13 relative to the shaft 14 may be effected by tightening or loosening a screw 19 which passes through an arched rigid member 20 and is threaded into the base of the sector yoke 15. Prior to assembly, the arms of the sector yoke 15 are spread slightly as shown in Figure IV. By tightening the screw, the arms of the yoke 15 assume a normal parallel position as shown in Figure V. Further tightening of the screw 19 causes the arms of the yoke 15 to be brought still closer together. Adjustment of the distance between the arms is brought about by deforming the base of the yoke by causing it to conform more or less to the shape of the rigid member 20. It should be understood that the member 20 may be of any shape with which the base of the yoke can be made to conform so as to adjust the distance between the arms thereof.

Figure VII illustrates a modification of the invention in which an arched rigid member 20a is on the opposite side of the base of a U-shaped yoke 15a from that shown as the preferred form of the invention. A screw 19a is adjusted from the same side as before but in this instance passes through the base and is threaded into the rigid member 20a. The head of the screw 19a preferably is on the side of the yoke 15a away from the shaft on which it is rotatably carried for ease of adjustment, but may be on either side. In the modification shown in this figure, and also the modifications shown in Figures VIII and IX, tightening of the adjusting screws spreads the arms of the yoke whereas in the preferred embodiment of the invention, tightening caused the arms to be adjusted toward each other.

Figure VIII illustrates a modification in which the convex side of an arched member 20b is adjacent the base of a yoke 15b and adjustment is effected by tightening or loosening either of a pair of screws 19b.

Figure IX shows a modification, somewhat similar to that of Figure VIII, in which only one adjusting screw 19c is required and the opposite end of a member 20c is fastened to a yoke 15c as by means of a rivet 21.

Although the arms of the yoke may be slightly out of parallel when adjusted according to the invention, it has little or no effect on the weighing accuracy of the scale.

The shape of the member 20 is immaterial, provided it accomplishes the function of adjusting the distance between the arms of the yoke 15.

Various modifications in the details of construction of the parts may be made without departing from the spirit and scope of the invention.

Having described the invention, I claim:

1. In a device of the class described, in combination, a U-shaped elastically deformable member, an arched rigid member spanning a portion of the base of said U-shaped member, and means for urging the portion of the base spanned by said rigid member into partial conformity therewith.

2. A device according to claim 1 in which the means for urging the portion of the base into partial conformity with the rigid member comprises at least one screw passing through one of said members and threaded into the other of said members.

3. In a device of the class described, in combination, a U-shaped elastically deformable member, an arched rigid member spanning a portion of the base of said U-shaped member with its concavity facing said base, and means for urging the portion of the base of said U-shaped member spanned by said rigid member into partial conformity therewith.

4. A device according to claim 3 in which the means for urging the portion of the base into partial conformity with the rigid member comprises a screw passing through one of said members and threaded into the other of said members.

5. In a device of the class described, in combination, a U-shaped elastically deformable member, a curved rigid member spanning a portion of the base of said U-shaped member wtih the convex side of said rigid member facing said base, and means for urging the portion of the base spanned by said rigid member into partial conformity therewith.

6. A device according to claim 5 in which the means for urging the portion of the base into partial conformity with the rigid member comprises a pair of screws passing through the rigid member near its ends and threaded into the base of the U-shaped member.

7. A device according to claim 5 in which one end of the rigid member is fastened to the base of the U-shaped member and the means for urging the portion of the base into conformity with the rigid member comprises a screw passing through the end of said rigid member opposite the fastened end and threaded into the base of said U-shaped member.

8. In a device for adjusting the thrust on the ends of a rotatable shaft, in combination, an anti-friction bearing for each end of the shaft, a U-shaped member having its arms carrying the bearings, said U-shaped member being deformable, an arched member spanning a portion of the base of the U, and means for urging the portion of the base into partial conformity with the arched member whereby the distance between the arms is changed and the thrust between the bearings and shaft is adjusted.

9. A device according to claim 8 in which the means for urging the portion of the base into partial conformity with the arched member comprises at least one screw passing through one of said members and threaded into the other of said members.

10. A device according to claim 9 in which the arched member has its concavity facing the base.

11. In a device for adjusting the thrust on the ends of a rotatable shaft, in combination, an anti-friction bearing for each end of the shaft, a U-shaped member having its arms carrying the bearings, said U-shaped member being deformable, a curved member spanning a portion of the base of the U with the convex side thereof facing the base, and means for drawing the portion of the base into partial conformity wtih the curved member whereby the distance between the arms is changed and the thrust between the bearings and the shaft is adjusted.

12. A device according to claim 11 in which the means for drawing the portion of the base into partial conformity with the curved member comprises a pair of screws passing through the curved member near its ends and threaded into the base of the U-shaped member.

13. A device according to claim 11 in which one end of the curved member is fastened to the base of the U-shaped member and the means for drawing the portion of the base into partial conformity with the curved member comprises a screw passing through the end of the curved member opposite the fastened end and threaded into the base of said U-shaped member.

14. In a device of the class described, in combination, a U-shaped elastically deformable member, a rigid member extending along the base of said U-shaped member generally parallel with said base, said rigid member bearing against said base at spaced apart points, and means for urging the portion of the base spanned by said rigid member into partial conformity therewith.

15. In a device of the class described, in combination, a U-shaped elastically deformable member, a rigid member extending along the base of said U-shaped member generally parallel with said base, said rigid member having only a portion thereof bearing against said base, and means for urging the portion of the base spanned by said rigid member into partial conformity with the portion of the rigid member not bearing against said base.

References Cited in the file of this patent

UNITED STATES PATENTS

| 272,922 | Tucker | Feb. 27, 1883 |
| 680,567 | Cottrell | Aug. 13, 1901 |
| 1,783,193 | Matthews | Dec. 2, 1930 |
| 1,784,005 | Grabler | Dec. 9, 1930 |

FOREIGN PATENTS

| 335,920 | Germany | Apr. 18, 1921 |